United States Patent
Huang

(10) Patent No.: US 7,907,905 B2
(45) Date of Patent: Mar. 15, 2011

(54) RADIO FREQUENCY MANAGEMENT SYSTEM

(75) Inventor: Keng-Ying Huang, Hsin Chuang (TW)

(73) Assignee: J-Link Technology Corporation, Chung Ho, Taipei Hsien (TW)

( * ) Notice: Subject to any disclaimer, the term of this patent is extended or adjusted under 35 U.S.C. 154(b) by 669 days.

(21) Appl. No.: 12/022,139

(22) Filed: Jan. 29, 2008

(65) Prior Publication Data

US 2008/0182541 A1    Jul. 31, 2008

(30) Foreign Application Priority Data

Jan. 30, 2007    (TW) .............................. 96201786 U

(51) Int. Cl.
*H04B 1/00*      (2006.01)
*H04B 15/00*     (2006.01)
*H04Q 5/22*      (2006.01)

(52) U.S. Cl. ...................................... 455/63.1; 340/10.2

(58) Field of Classification Search .............. 455/63.1, 455/41.1, 41.2, 103; 340/10.1, 10.2, 572.1, 340/572.7
See application file for complete search history.

(56) References Cited

U.S. PATENT DOCUMENTS

| | | | |
|---|---|---|---|
| 2006/0022815 A1* | 2/2006 | Fischer et al. | 340/505 |
| 2008/0048869 A1* | 2/2008 | Wang et al. | 340/572.8 |
| 2008/0143485 A1* | 6/2008 | Frerking | 340/10.1 |

* cited by examiner

*Primary Examiner* — Nguyen Vo
(74) *Attorney, Agent, or Firm* — Pai Patent & Trademark Law Firm; Chao-Chang David Pai

(57) ABSTRACT

A radio frequency management device includes a microprocessor, output devices connected in parallel to the microprocessor, reading units respectively connected to the output devices, each reading unit comprising an antenna coil, a blocking coil, a radio frequency driver module for driving the antenna coil, and a blocking driver module for driving said blocking coil to shield the antenna coil from the radio frequency driver module, and a reading and writing device connected to the microprocessor. The microprocessor controls the output devices in such a manner that only one radio frequency driver module is activated to drive the associated antenna coil at any time while the other antenna coils of the other reading units are shielded from the associated radio frequency driver modules by the associated blocking coils; the reading units are processed one after another in a proper order.

7 Claims, 3 Drawing Sheets

RADIO FREQUENCY MANAGEMENT SYSTEM

BACKGROUND OF THE INVENTION (a) Field of the Invention

The present invention relates to radio frequency technology and more particularly to a radio frequency management system for use in a shop inventory control system.

(b) Description of the Prior Art

Many different types of radio frequency identification devices are known. In a typical application of radio frequency identification, each product to be identified carries a chip that has identification data stored in a read only memory or read write memory therein, and a reading apparatus is operated to transmit a radio frequency signal to the chip via an antenna so that the storage data of the chip is fetched and sent back to the antenna by means of a radio carrier. The fetched data is then demodulated for further data processing. This technology can be applied to product distribution management to save much management time and labor. It has become increasingly popular for radio frequency management to be applied in different industries.

Currently, radio frequency identification applications are limited to short distance induction, i.e., for wireless data transmission at a distance within 10~30 cm from the products. Beyond this range, the effect becomes poor because of interference of similar surrounding frequencies. Further, when multiple reading devices are arranged in parallel, the antenna transmission may cause erroneous readings of the data outside the desired range, thereby causing trouble and affecting the management integrity. Therefore, the reading operation is usually performed in a particular place, and sometimes only a mobile reading operation can be performed.

Therefore, it is desirable to provide a radio frequency identification management device that eliminates the problem of reading errors present in prior art designs.

SUMMARY OF THE INVENTION

The present invention has been accomplished under the circumstances in view. It is the main object of the present invention to provide a radio frequency management device which is practical for real-time shop inventory control. To facilitate shop inventory control, every product in the product rack carries a radio frequency chip. However, the location of the products and the transmitting and receiving operations of the antenna of the reading and writing device must be maintained within the effective range. When reading units are arranged adjacent to one another, interference among the reading units must be eliminated. By applying the present invention, the reading of all products in a specific space is accurately controlled. The invention applies a blocking concept such that only one reading unit is allowed to work at any time while the other reading units are blocked. Therefore, when one reading unit is at work, the reading unit is prohibited from reading the products in another adjacent space, and therefore the radio frequency management device of the present invention can achieve real time shop inventory control.

To achieve this and other objects of the present invention, the radio frequency management device comprises a microprocessor, output devices connected in parallel to the microprocessor, reading units respectively connected to the output devices, each reading unit comprising an antenna coil, a blocking coil, a radio frequency driver module for driving the antenna coil, and a blocking driver module for driving said blocking coil to shield the antenna coil from the radio frequency driver module, and a reading and writing device connected to the microprocessor. The microprocessor controls the output devices in such a manner that only one radio frequency driver module is activated to drive the associated antenna coil at any time while the other antenna coils of the other reading units are shielded from the associated radio frequency driver modules by the associated blocking coils; the reading units are processed one after another in a proper order.

DETAILED DESCRIPTION OF THE PREFERRED EMBODIMENTS

Figure 1:
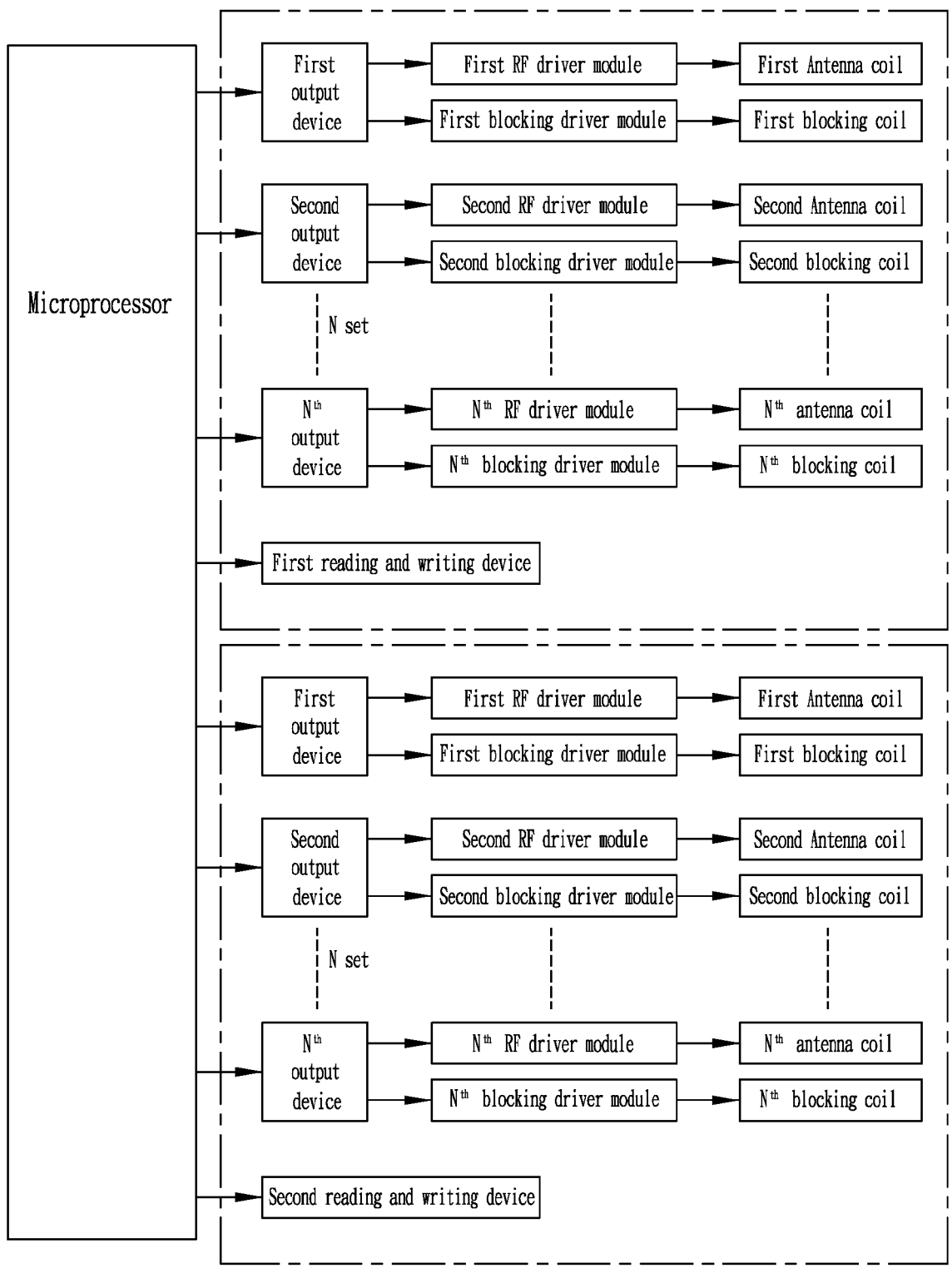
FIG. 1 is a circuit block diagram of the radio frequency management system according to the present invention.
Figure 2:
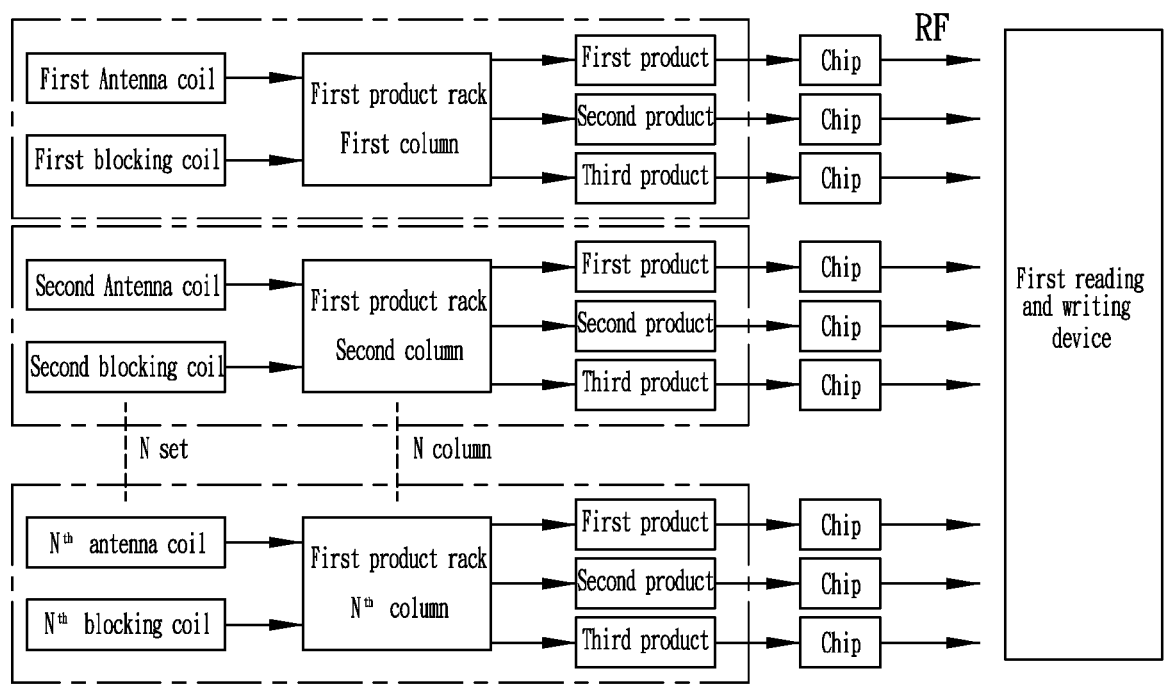
FIG. 2 is a block diagram showing the application of the radio frequency management system according to the present invention.
Figure 3:
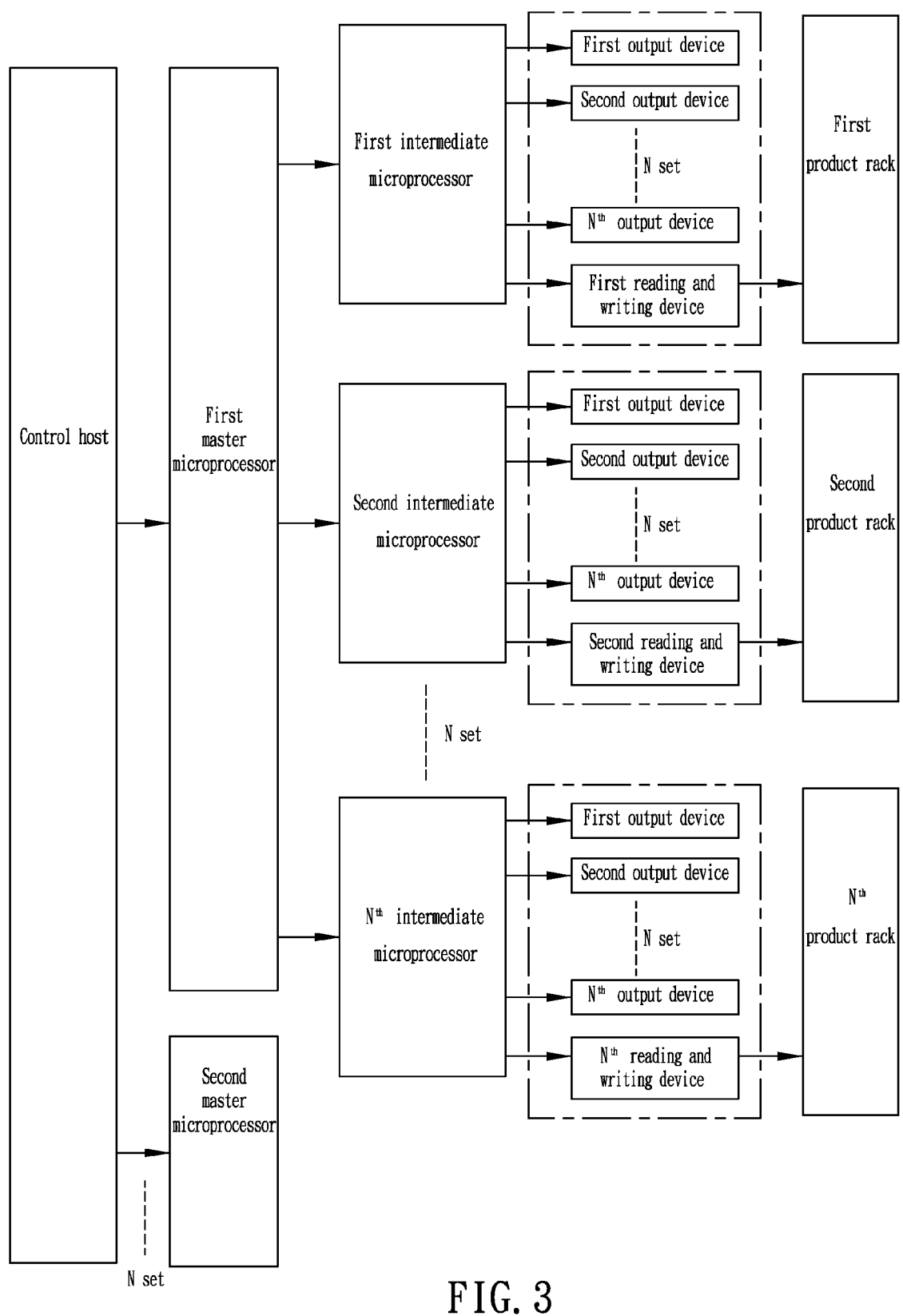
FIG. 3 is a block diagram of an expanded application of the radio frequency management system according to the present invention.

In FIGS. 1~3 is shown a radio frequency management system comprising, for example, two radio frequency management devices that are distinguished by reading and writing devices, i.e. each radio frequency management device comprises multiple reading units that are connected in parallel to one same reading and writing device. Each reading unit comprises multiple RF (radio-frequency) driver modules (first RF driver module, second RF driver module, . . . Nth RF driver module) and multiple blocking driver modules (first blocking driver module, second blocking driver module, . . . Nth blocking driver module). Each RF driver module is adapted for driving a respective antenna coil. Each blocking driver module is adapted for driving a respective blocking coil to block the associated antenna coil. Each RF driver module and the associated blocking driver module are electrically connected to one respective output device (first output device, second output device, . . . Nth output device). The output devices and the reading and writing devices (first reading and writing device, second reading and writing device) are electrically connected to a microprocessor. The output devices that belong to one same reading and writing device are controlled by the microprocessor to have the RF driver module of one reading unit to be driven at any time while the blocking driver modules of the other reading units are driven to shield the associated antenna coils. The reading units are cycled at a predetermined time interval subject to the control of the microprocessor.

The antenna coils have the respective inner ends connected to the reading and writing device by a coaxial cable.

It is well seen in FIG. 2 that each reading unit corresponds to one column (in FIG. 2, the first reading unit corresponds to the first column of the first rack, the second reading unit corresponds to the second column of the first rack, . . . the Nth reading unit corresponds to the Nth column of the first rack). Products are placed in every column (product number 1~product number 3 are shown). Every product carries a chip that responds to the reading and writing device (the first reading and writing device is shown) by means of radio frequency. Therefore, one rack corresponds to one reading and writing device. However, this is not a limitation, for example, multiple reading and writing devices can correspond to one rack according to requirements. The reading and writing device can be installed in the top or bottom side of the rack, and the reading units are provided at one side of the rack. FIG. 3 shows an Ethernet-like expanded application of the present invention. When one rack corresponds to only one reading and writing device (for example, as shown in FIG. 3, the first rack corresponds to the first reading and writing device), intermediate microprocessors (intermediate microprocessors numbered from 1 through N) are connected to a master microprocessor, and a control host is connected with multiple master microprocessors (master microprocessors numbered from 1 through N).

The invention can be used in book inventory control. According to conventional techniques, reading the data of the books that are kept in bookracks requires an external data reader. By applying the present invention, any book that is taken away or moved from its position can be immediately discovered. Therefore, the invention can be used for inventory control or product location guide. In one application example of the present invention, a radio frequency management system comprises a control host that controls 8 master microprocessors, each master microprocessor controls 8 intermediate microprocessors, and each intermediate microprocessor controls 8 reading units, and therefore there are in total 512 reading units in operation. By means of this architecture, the induction distance between the antenna and the product can be extended to 30 cm, meeting ISO 15693 wireless transmission chip standards. The antenna coil and the blocking coil of one same reading unit are arranged on two opposite sides of one single circuit board, forming an on/off operation loop. The control of each output device can be achieved by means of a relay, so that a limited number of antenna coils are driven for induction and a great number of the blocking coils are driven to provide a shielding effect, providing assigned induction, and enabling reading and writing operations to be cycled through the whole system in proper order. This technical device provides excellent assigned reading and writing application performance, showing enhanced performance from conventional designs.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A radio frequency management device comprising:
   a microprocessor,
   a plurality of output devices connected in parallel to said microprocessor;
   a plurality of reading units respectively connected to said output devices, each said reading unit comprising an antenna coil, a blocking coil, a radio frequency driver module adapted for driving said antenna coil, and a blocking driver module adapted for driving said blocking coil to shield said antenna coil from said radio frequency driver module; and
   a reading and writing device connected to said microprocessor;
   wherein said microprocessor controls the operation of said output devices such that only the radio frequency driver module of one said reading unit is activated to drive the associated antenna coil at any time while the antenna coils of the other reading units are shielded from the associated radio frequency driver modules by the associated blocking coils.

2. The radio frequency management device as claimed in claim 1,
   wherein said reading units are processed by said microprocessor in a predetermined order.

3. The radio frequency management device as claimed in claim 2,
   wherein said reading units are processed in order at a predetermined time interval.

4. The radio frequency management device as claimed in claim 1,
   wherein the antenna coils of said reading units are connected with said reading and writing device by a coaxial cable.

5. The radio frequency management device as claimed in claim 1,
   wherein said microprocessor is an intermediate microprocessor, and is connected to a master microprocessor.

6. The radio frequency management device as claimed in claim 5,
   wherein each of said output devices is a relay.

7. A radio frequency management system comprising a control host and a plurality of master microprocessors connected to the control host, wherein each master microprocessor is connected to a plurality of radio frequency management devices, each radio frequency management device comprising:
   a microprocessor;
   a plurality of output devices connected in parallel to said microprocessor;
   a plurality of reading units respectively connected to said output devices, each said reading unit comprising an antenna coil, a blocking coil, a radio frequency driver module adapted for driving said antenna coil, and a blocking driver module adapted for driving said blocking coil to shield said antenna coil from said radio frequency driver module; and
   a reading and writing device connected to said microprocessor;
   wherein said microprocessor controls the operation of said output devices such that only the radio frequency driver module of one said reading unit is activated to drive the associated antenna coil at any time while the antenna coils of the other reading units are shielded from the associated radio frequency driver modules by the associated blocking coils.

* * * * *